United States Patent [19]

Nishimura

[11] 4,195,772
[45] Apr. 1, 1980

[54] MARK SENSING APPARATUS

[75] Inventor: Yasuhiko Nishimura, Yokosuka, Japan

[73] Assignee: Ricoh Denshi Kogyo Kabushiki Kaisha, Tokyo, Japan

[21] Appl. No.: 904,339

[22] Filed: May 9, 1978

[30] Foreign Application Priority Data

May 24, 1977 [JP] Japan .................................. 52-65926

[51] Int. Cl.² .......................... G06K 7/06; G06K 7/10; G09B 23/00
[52] U.S. Cl. .................................... 235/441; 35/48 B; 235/462
[58] Field of Search ............... 235/492, 441, 442, 443; 35/48 B; 235/489, 462

[56] References Cited

U.S. PATENT DOCUMENTS

| | | | |
|---|---|---|---|
| 1,573,174 | 2/1926 | Lasker | 235/441 |
| 3,209,471 | 10/1965 | Brittan | 35/48 B |
| 3,509,324 | 4/1970 | Shaw | 35/48 B |
| 3,542,287 | 11/1970 | Schena | 35/48 B |
| 3,631,611 | 1/1972 | Abell | 35/48 B |
| 3,749,887 | 7/1973 | Giuliani | 235/492 |
| 4,095,091 | 6/1978 | Nakano | 235/462 |
| 4,104,682 | 8/1978 | Lehner | 235/462 |

Primary Examiner—Robert M. Kilgore
Attorney, Agent, or Firm—Oblon, Fisher, Spivak, McClelland & Maier

[57] ABSTRACT

A mark sensing apparatus for detecting the presence of electrically conductive mark traces at designated files on a mark sheet. A plurality of thin, insulated electrically conductive brushes contact each mark file. The brushes are arranged as interleaved pairs, with alternated brushes interconnected. The presence of a mark shortcircuits at least one of the brush pairs, and resulted in a detectable current pulse. A current waveform connected to the interconnected brush pairs produces an undistorted waveform whenever the brush pairs are short circuited.

1 Claim, 5 Drawing Figures

MARK SENSING APPARATUS

BACKGROUND OF THE INVENTION

1. Field of the Invention:

This invention relates to a mark sensing apparatus for reading marks on a marked sheet.

2. Description of the Prior Art:

In the prior art, in order to sense the presence or absence of marks on marked sheets, such as computer data input cards or sheets, the presence or absence of marks is optically determined by means of the intensity of light reflected from the sheet. The reflected light is then photoelectrically converted and amplified to generate a signal current for reading the mark. Therefore, these apparata have been large and expensive while exhibiting a complicated construction. Furthermore, these apparata have demonstrated low reliability and stability, particularly in misinterpreting stains or contaminations on the card or sheet as if these contaminations indicated presence of marks.

The present applicant has previously developed a mark sensing device, as shown schematically in FIGS. 1 and 2, wherein a mark sheet a is provided with a plurality of data files c extending the entire length of the mark sheet a. Electrically conductive data marks b are disposed on designated locations of each data file c. The marks b are electrically conductive traces made by lead or electrically conductive ink. The sheet a is fed to a pair of feed rollers d, e, with the upper feed roller d usually called a capstan and the lower roller 3 usually called a pinch roll. The rollers d, e driven by the electric motor 5 then feed the mark sheet a beneath a brush holding beam f provided in parallel with the feed rollers d, e. Mounted on the beam f is a plurality of pairs of electrically conductive brushes, with each pair consisting of discrete brushes g, h which contact a corresponding data file c.

The electrically conducting brushes g, h serve as the end contacts of a signal generator i, connected to a computer j, for example.

When a marked sheet a having marks b made by lead or electrically conductive ink or mark files c is pinched and transported by the pair of feed rollers d, e of the apparatus shown in FIGS. 1 and 2, the paired conductive brushes g, h are short-circuited and rendered current conductive between each other due to the electrically conductive trace of the marks b, which then completes a circuit between the brushes g, h. Since each conductive brush is the end contact of the circuit of the signal generator i, the signal current through the brushes g, h acts as the data input signal current for the computer j, by means of the signal generator i. Thus, as marks b can be made by a pencil, this apparatus is simple in construction and economical in manufacturing costs in comparison with the photoelectric type apparatus of the prior art. Moreover, even when the marked sheet is soiled, the circuit is closed without fail and without error because the marks are made by traces formed by continued particles. Therefore, the apparatus has high reliability and stability.

But, the marks b must be correctly and accurately drawn, for instance, the marks b must be straight lines of requisite length, and these lines must be parallel with the ends of the brushes g, h, otherwise error can result. Therefore, the preparation of marks b on a sheet a for use with the apparatus shown in FIGS. 1 and 2 requires skill, and can effect efficiency.

SUMMARY OF THE INVENTION

Accordingly, it is an object of this invention to provide a novel mark sensing device with improved sensing accuracy.

Another object is to provide a novel mark sensing device with an improved brush construction in which the criticality of the preparation of data marks is considerably diminished.

These and other objects of the invention are achieved by providing an improved brush construction in which a plurality of very fine brushes are dedicated to a single mark file. The brushes g, h are formed of very fine brushes separated by an electrically insulating material surrounding each brush. The brushes g, h are then interleaved and disposed across a mark file c, with alternate brushes interconnected to form two groups of interconnected brushes, with each group serving as a mark sensing end contact. Thus, the mark sensing apparatus according to the invention is virtually uneffected by irregularities which normally occur during mark formation. A waveform reshaping circuit is connected in the brush circuit to supply a clean error-free signal to the generating circuit of the read signal generator i.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
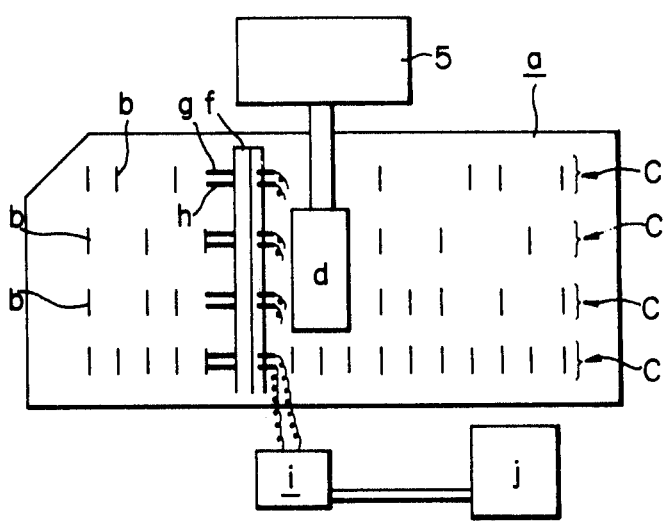
FIG. 1 is a schematical plan view of an exemplary embodiment of the mark sensing apparatus according to the prior invention by the Applicant.
Figure 3:
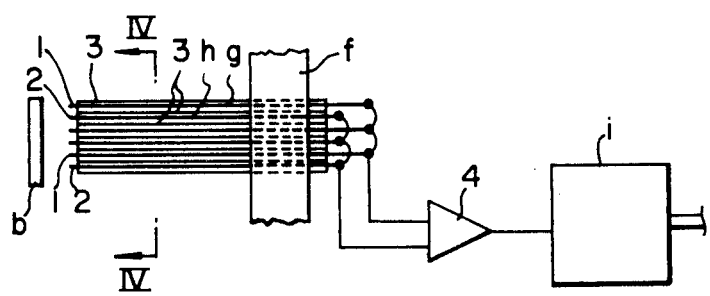
FIG. 3 is a schematical plan view of the improved brush construction of the mark sensing apparatus according to the present invention.
Figure 2:
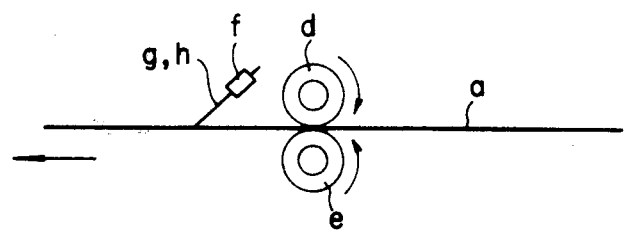
FIG. 2 is a schematical front view of the apparatus of FIG. 1.
Figure 4:
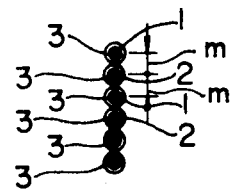
FIG. 4 is a sectional view taken along the lines IV—IV of FIG. 3.
Figure 5:
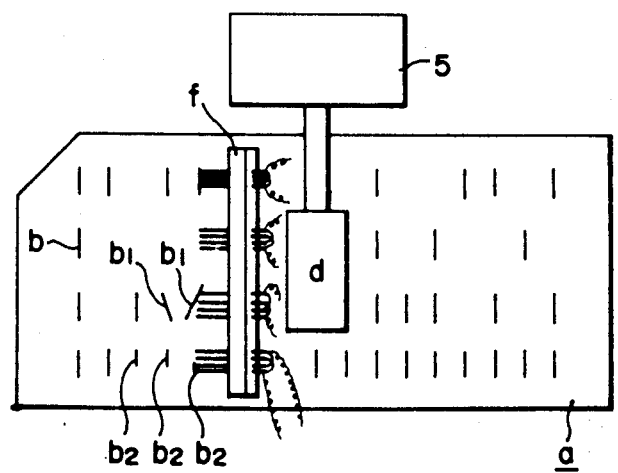
FIG. 5 is a schematic system plan view of the present invention.

Referring now to the drawings, wherein like reference numerals and characters designate identical or corresponding parts throughout the several views, and more particularly to FIGS. 3-5 thereof, the reference character a designates the marked sheet, b the marks, c the mark files, d, e the feed rollers; g, h the brushes; i the read signal generator; 1 the end contacts of the first terminal, 2 the end contacts of the second terminal; 3 the electric insulators; 4 the current wave reshaping circuit, and 5 the electric motor. The mark sensing apparatus according to the invention is constructed as follows:

A marked sheet a, in which the mark files c are marked with electrically conductive traces of lead or conductive ink, as described above, is pinched and transported by a pair of feed rollers d, e. A plurality of pairs of electrically conductive brushes g, h are attached to the brush holding beam f in parallel with the axis of the rollers d, e so that the ends of the brushes g, h contact the mark files c.

According to the invention, however, a plurality of pairs of brushes g, h are dedicated to each mark file c, as shown in FIGS. 3 and 5. The brush pairs g, h are interleaved across the mark file c, with the brushes g alternated with the brushes h. Each of the brushes g is electrically connected to each other, and similarly the brishes h are likewise interconnected. Thus, the connected brushes g form the end contacts of a first mark sensing terminal 1, while the end brushes h form the end contacts of a second mark sensing terminal 2.

The provision of the plurality of interleaved pairs of brushes g, h is enabled by making each brush quite thin, e.g., approximately 0.2 mm in diameter, and by surrounding each brush with an electric insulator 3 having a thickness of approximately 0.1 mm. Thus, the centers of adjacent brushes g, h are separated by narrow gap m, e.g., 0.4 mm. As shown in FIG. 3, the first and second terminals 1, 2 connected to the brushes g, h are then applied to a current wave reshaping circuit 4. Because of the aforementioned construction of this invention, even when marks are made slanted as shown by $b_1$, or short or dot-like as shown by $b_2$ in FIG. 5, the contacts 1 and 2 will surely be rendered conductive between each other, since the brushes forming end contacts 1 and 2 of each terminal are very fine and the gap m is very narrow. If the current wave is slightly distorted due to the change of contact resistance or chattering, the current wave reshaping circuit 4 corrects the wave and inputs to the generating circuit of the read signal generator i without error.

As the invention provides the aforementioned construction and operation, any mark on the marked sheet will be sensed without fail virtually regardless of the mark length or slant. Therefore, the marking operation can easily and rapidly be performed without deliberation, resulting in improved efficiency.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for sensing electrically conductive marks on a mark file of a marked sheet comprising:
    sensing means having two input terminals for sensing a short-circuiting of the two terminals,
    a plurality of juxtaposed pairs of parallel and electrically conductive brushes, alternate brushes being electrically insulated from one another and electrically connected at one end to opposite input terminals of the sensing means,
    the separation between the centers of adjacent brushes being much less than the width of a mark file and the separation between the centers of the two end brushes in the plurality being substantially the width of a mark file,
    a pair of feed rollers disposed in front of the plurality of brush pairs for pinching a marked sheet and feeding the sheet to the brush pairs to enable the other ends of the plurality of brushes to slide on a mark file of the sheet;
    whereby the presence of an electrically conductive mark on the mark file will cause at least two of the brushes to be short circuited and the mark will be sensed by the sensing means regardless of the length or straightness of the mark.

* * * * *